(12) United States Patent
Ferlin

(10) Patent No.: US 9,989,440 B2
(45) Date of Patent: Jun. 5, 2018

(54) TIRE SIDEWALL FOR A HEAVY CIVIL ENGINEERING VEHICLE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Olivier Ferlin, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 249 days.

(21) Appl. No.: 14/439,624

(22) PCT Filed: Oct. 23, 2013

(86) PCT No.: PCT/EP2013/072136
§ 371 (c)(1),
(2) Date: Apr. 29, 2015

(87) PCT Pub. No.: WO2014/067824
PCT Pub. Date: May 8, 2014

(65) Prior Publication Data
US 2015/0316449 A1    Nov. 5, 2015

(30) Foreign Application Priority Data
Oct. 31, 2012    (FR) ...................... 12 60412

(51) Int. Cl.
*G01M 17/02* (2006.01)
*B60C 13/00* (2006.01)
(Continued)

(52) U.S. Cl.
CPC ........... *G01M 17/02* (2013.01); *B60C 13/001* (2013.01); *B60C 13/02* (2013.01);
(Continued)

(58) Field of Classification Search
CPC ..................................... G01M 17/02
See application file for complete search history.

(56) References Cited

U.S. PATENT DOCUMENTS 3,449,201 A * 6/1969 Jonnes .................. B60C 13/001
152/523
4,077,454 A * 3/1978 Miyoshi ................ B60C 9/2009
152/527
(Continued)

FOREIGN PATENT DOCUMENTS

| DE | 10 2009 044 718 | 6/2011 |
|----|---|---|
| JP | 59-11903 | 1/1984 |
| JP | 2012-106704 | 6/2012 |

OTHER PUBLICATIONS

Office Action dated Mar. 15, 2017 which issued in the corresponding Japanese Patent Application No. 2015-538427.

*Primary Examiner* — Lisa Caputo
*Assistant Examiner* — Alex Devito
(74) *Attorney, Agent, or Firm* — Cozen O'Connor

(57) ABSTRACT

Method for indicating attacks on a tire (1) for a heavy vehicle of the civil engineering type. This method comprises a first step of applying a retroreflective covering material (7) to at least part of at least one tire lateral face (6) allowing visual detection in an environment of darkness of that part of at least one tire lateral face (6), a second step of using the tire (1) in a mechanically aggressive environment, a third step of identifying, in an environment of darkness, the attacked zones (8) of the part of at least one tire lateral face (6) initially covered with the retroreflective covering material (7) and now devoid of the said retroreflective covering material (7) as a result of the mechanical attack experienced by the tire (1) in use.

7 Claims, 2 Drawing Sheets

(51) Int. Cl.
 *B60C 13/02* (2006.01)
 *B60C 19/00* (2006.01)
(52) U.S. Cl.
 CPC .... *B60C 2019/004* (2013.01); *B60C 2200/06* (2013.01); *B60C 2200/065* (2013.01)

(56) References Cited

U.S. PATENT DOCUMENTS

| | | | | |
|---|---|---|---|---|
| 5,176,769 | A | * | 1/1993 | Kadota ................ B60C 9/2009 152/523 |
| 6,023,967 | A | * | 2/2000 | Chung ................ G01M 17/027 73/146 |
| 6,221,453 | B1 | | 4/2001 | Majumdar |
| 2003/0140999 | A1 | | 7/2003 | Smith et al. |

* cited by examiner

TIRE SIDEWALL FOR A HEAVY CIVIL ENGINEERING VEHICLE

RELATED APPLICATIONS

This is a U.S. National Phase Application under 35 USC 371 of International Application PCT/EP2013/072136 filed on Oct. 23, 2013.

This application claims the priority of French application no. 1260412 filed Oct. 31, 2012, the entire content of which is hereby incorporated by reference.

FIELD OF THE INVENTION

The present invention relates to a tire for a heavy vehicle of the civil engineering type intended to move around in an environment of darkness, such as a vehicle used in underground mining.

BACKGROUND OF THE INVENTION

Vehicles used in underground mining operations, either at the cutting face, or for transporting ore, usually move around in an environment of darkness. In any case, they are constrained in their movements by the cramped nature of the tunnels, the severity of the direction changes, for example in the case of a network of perpendicular tunnels, and by the near total darkness prevailing in underground mines. In this visually degraded environment, the risk of collision between a vehicle and any obstacle present in its path, such as the wall of a tunnel, is not insignificant.

As the main source of light is limited to the beams emitted by the head lamps of the miners, locating these vehicles is particularly difficult. Visual detection of these vehicles in an environment of darkness is therefore an important requirement for an operator of an underground mine.

As far as visually detecting an object in an environment of darkness is concerned it is known practice to use a retroreflective device, which is a passive system, intended to highlight the presence of an object by night or in darkness and which is based on the application of the optical system known as a retroreflector.

Retroreflection is the name given to reflection in which the rays of light are reflected in a direction similar to the direction from which they came, this property being maintained despite wide variations in the direction of the incident rays.

A retroreflective device is the name given to a device which, when irradiated directionally, retroreflects a relatively high proportion of the incident radiation.

It is known practice to incorporate retroreflective covering materials into the sidewalls of a tire, particularly a tire for a two-wheeled vehicle. Agreement addendum 87 to UN regulation 88 of 20 Mar. 1958 concerning the adoption of uniform conditions of approval and reciprocal recognition of approval from motor vehicle equipment and parts defines the uniform provisions concerning the approval of retroreflective tires for two-wheeled vehicles. A retroreflective tire, within the meaning of the abovementioned regulation 88, is a tire ready for use comprising a retroreflective circle incorporated into each of the sidewalls of the tire.

Through the materials and shapes used for a retroreflective device, manufacturers are looking for the best light reflection index, limiting losses of intensity through diffusion or absorption into the material. The basic materials are varied and adapted to the various uses. By way of examples and nonexhaustively, the marketplace includes adhesive tapes, technical fabrics, paints, and coating products based on glass microbeads acting as reflective pigment.

It is therefore beneficial to apply a retroreflective covering material to the sidewalls of a tire for a heavy vehicle of the civil engineering type intended to move around in an environment of darkness in order to allow the tire and the vehicle on which it is mounted to be detected visually in an environment of darkness.

A tire comprises a tread intended to come into contact with the ground via a tread surface. The tread surface extends axially, i.e. parallel to the axis of rotation of the tire, between two axial ends. Each axial end of the tread surface is extended radially inwards, namely in a direction perpendicular to the axis of rotation of the tire, by two tread end faces. Each tread end face is extended radially inwards by a sidewall external face. The assembly consisting of a tread end face and the sidewall external face extending it radially inwards constitutes a tire lateral face. What is meant by an external surface of the tire is the assembly made up of the tread surface and the two tire lateral faces, which are symmetric about the equatorial plane of the tire passing through the middle of the tread surface and perpendicular to the axis of rotation of the tire.

In an underground mining environment, the external surface of the tire is generally subjected to mechanical attack, on the one hand because of the presence of numerous somewhat angular blocks of stone on the ground and, on the other hand, because of the aggressiveness of the tunnel walls which are hewn from rock.

This mechanical attack may cause chunks of material to be torn out, particularly from the lateral faces of the tire, or may even cause the tire to puncture. In the event of significant chunking, the tire has to be replaced prematurely in relation to its usual life, leading to additional operating costs. In the event of a puncture, changing the tire may moreover prove difficult given the cramped environment and the vehicle may even become stuck in a tunnel, as a result of a tilting of the axle on which the punctured tire is mounted. In any event, the immobilization of the vehicle results in a loss of productivity.

There is therefore a great benefit, to an operator of an underground mine, in being able visually in an environment of darkness to detect the attacked zones of the tire lateral faces in order to be able to plan in the necessary maintenance operations.

SUMMARY OF THE INVENTION

One object of the invention is to enable visual detection, in an environment of darkness, of the attacked zones of the lateral faces of a tire fitted to a heavy vehicle of civil engineering type used in an aggressive mechanical environment such as that of underground mines.

This and other objects are attained in accordance with one aspect of the invention directed to a method for indicating attacks on a tire for a heavy vehicle of the civil engineering type, the tire comprising a tread, the tread comprising a tread surface having two axial ends extended radially inwards by two tread end faces, each tread end face being extended radially inwards by a sidewall external face, a tread end face and the sidewall external face extending it radially inwards constituting a tire lateral face, the method comprising:

a first step of applying a retroreflective covering material to at least part of at least one tire lateral face allowing visual detection in an environment of darkness of that part of at least one tire lateral face, a second step of using the tire in a mechanically aggressive environment, a third step of identifying, in an environment of darkness, the attacked zones of the part of at least one tire lateral face initially covered with the retroreflective covering material and now devoid of the said retroreflective covering material as a result of the mechanical attack experienced by the tire in use.

A method of indicating attacks on the tire is a method that makes it possible visually in an environment of darkness to determine a qualitative and/or quantitative level of attack on the tire. What is meant by attack is any accidental removal of elastomeric material on a lateral face of the tire, either at an end face of the tread or at an external face of the sidewall. An attack within the meaning of the invention does not cover the tread surface.

The method of indicating attacks on the tire comprises a first step of applying a retroreflective covering material to at least part of at least one tire lateral face allowing visual detection in an environment of darkness of that part of at least one tire lateral face.

A retroreflective covering material is therefore applied to a tire lateral face. The mode of application depends on the nature of the retroreflective covering material. It may involve a step of placement, followed by a step of fixing, for example by heating, the retroreflective covering material.

It is possible for the retroreflective covering material to be applied to just one lateral face of the tire, particularly the outside lateral face of the tire which is the only face visible when the tire is mounted on the axle of a vehicle.

It is possible for the retroreflective covering material to be applied to only part of the lateral face of the relevant tire, particularly that part which is supposed to be most liable to attack. This tire lateral face part may be limited to all or part of the end face of the tread and/or all or part of the sidewall external face.

The retroreflective covering material thus applied to a tire lateral face allows the tire to be identified individually when stored, for example, in a storage location of an underground mine. It also allows the identification of the vehicle on which it is mounted.

The method for indicating attacks on the tire comprises a second step of using the tire in a mechanically aggressive environment.

In this second step, the tire, mounted on an axle of a vehicle, runs in its operating environment which is mechanically aggressive on the one hand because of the presence of numerous rather angular blocks of stone on the ground and on the other hand because of the aggressiveness of the tunnel walls hewn from the rock. The result of this is that those tire lateral face parts that have been attacked, which initially were covered with the retroreflective covering material, will lose the said retroreflective covering material as a result of the mechanical attacks suffered by the tire in use.

The method for indicating attacks on the tire comprises a third step of identifying, in an environment of darkness, the attacked zones of the part of at least one tire lateral face initially covered with the retroreflective covering material and now devoid of the said retroreflective covering material as a result of the mechanical attack experienced by the tire in use.

In this third step, the attacked zones of the tire lateral face which were initially covered with the retroreflective covering material will thus be able to be distinguished from the zones that have not been attacked through the disappearance of the retroreflective covering material. Retroreflective non-attacked zones and black-coloured attacked zones will thus be able to be seen on the tire lateral face. Local disappearance of the retroreflective covering is an indication of local attack on the tire lateral face.

Another advantage of the invention is that the stones or blocks of stone that cause the attack of the tire lateral faces will bear traces of the retro-reflective covering thus torn out. This will make it possible to determine which points are the most harmful to the tire along the path followed by the vehicle.

According to a first embodiment, the first step is a step of applying a retroreflective covering material to at least part of at least one sidewall external face. In other words, detection of the attacked zones is limited to a sidewall external face.

According to a second embodiment, the first step is a step of applying a retroreflective covering material to at least part of at least one tread end face. In other words, detection of the attacked zones is limited to a tread end face.

According to one preferred embodiment, the first step is a step of applying a retroreflective covering material of coating product type. By way of example, a retroreflective covering material of the coating product type may be a paint which offers the advantage of being easy to apply to a tire lateral face.

More preferably still, the first step is a step of applying a retroreflective covering material of the coating product type containing glass microbeads. This type of retroreflective covering material offers the advantage firstly of performing very well in terms of retroreflection and secondly of being particularly well suited to application to an elastomeric material such as that which makes up the tire lateral face. The method of applying such a retroreflective covering material is well known to those skilled in the art. By way of example, document U.S. Pat. No. 6,623,793 describes such a method of application.

According to a first alternative form, the third step of identifying, in an environment of darkness, the attacked zones of the part of at least one tire lateral face comprises a step of locating the attacked zones of the part of at least one tire lateral face. In other words, the indicator of attack is a purely qualitative indicator based on the location of the attacked zones alone.

According to a second alternative form, the third step of identifying, in an environment of darkness, the attacked zones of the part of at least one tire lateral face comprises a step of measuring the depth of the attacked zones of the part of at least one tire lateral face. For that reason the tire lateral face may be provided with circumferential grooves adjacent two by two and of different depths and covered with a retroreflective covering material. Under such conditions, identifying which grooves are still covered with retroreflective covering material after the attack provides an indication that the depth of the attack is less than that of the grooves that are still intact. This then gives a quantitative indication of the depth of the attack.

According to a third alternative form, the third step of identifying, in an environment of darkness, the attacked zones of the part of at least one tire lateral face comprises a step of measuring the spread of the attacked zones of the part of at least one tire lateral face. Measuring the spread of an attacked zone may simply consist in estimating the geometric area thereof. In that case, the indicator of attack may be a quantitative indicator such as, for example and nonexhaustively, a range within which the geometric areas of the attacked zones are contained, or the total geometric area attacked, which is the sum of the geometric areas of the attacked zones.

Finally, according to a fourth alternative form, the third step of identifying, in an environment of darkness, the attacked zones of the part of at least one tire lateral face comprises a step of counting the attacked zones of the part of at least one tire lateral face. In that case, the indicator of attack may be a quantitative indicator such as, for example and non-exhaustively, the total number of attacked zones on the tire lateral face or the number of attacked zones on a given part of a tire lateral face.

BRIEF DESCRIPTION OF THE DRAWINGS

The features of the invention will be better understood with the aid of the description of the attached FIGS. 1 and 2.

In order to make them easier to understand, FIGS. 1 and 2 have not been drawn to scale.

DETAILED DESCRIPTION OF THE DRAWINGS

Figure 1:
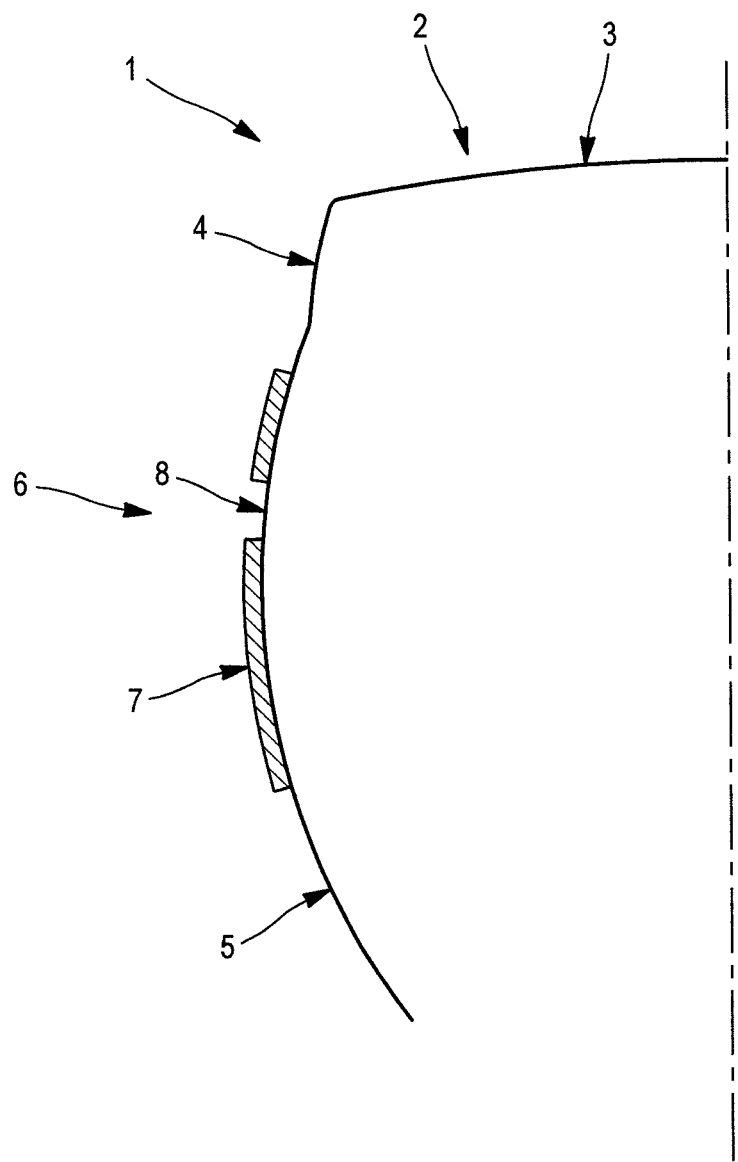
FIG. 1 depicts a meridian half-section of a tire, which means a section on a meridian plane containing the axis of rotation of the tire.

In FIG. 1, the tire 1, only a meridian half-section of which has been depicted, comprises a tread 2. The tread 2 comprises a tread surface 3 having an axial end extended radially inwards by a tread end face 4. The tread end face 4 is extended radially inwards by a sidewall external face 5. The tread end face 4 and the sidewall external face 5 extending it radially inwards constitute a tire lateral face 6. A retroreflective covering material 7 is applied to at least part of the tire lateral face 6 and, in this particular instance, to part of the sidewall external face 5. The thickness of retroreflective covering material 7 has not been drawn to scale here, in order to aid understanding. A discontinuity in the retroreflective covering material 7 indicates a zone 8 that has been attacked.

Figure 2:
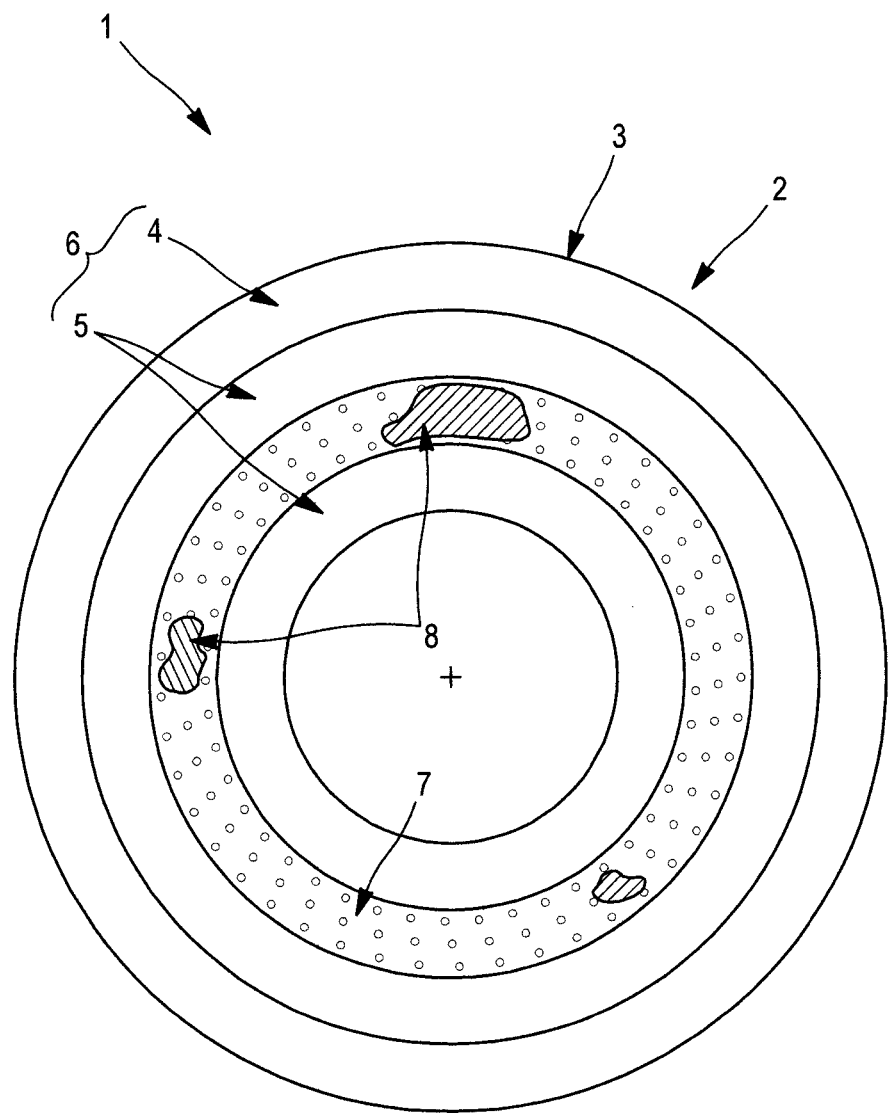
FIG. 2 depicts a profile view of a tire according to an embodiment of the invention.

In FIG. 2, the tire 1, viewed in profile, comprises a tread 2 intended to come into contact with the ground via a tread surface 3. The tire lateral face 6, consisting of the tread end face 4 and the sidewall external face 5, is covered over part of the sidewall external face 5 with a retroreflective covering material 7 which stands proud of the sidewall external face 5. Attacked zones 8 in the part of the sidewall external face 5 that was initially covered with the retroreflective covering material 7 are also depicted, in the form of hatched discontinuities in the retroreflective covering material 7.

The invention was more particularly tested on a tire fitted to an underground mining operating vehicle, with a retroreflective material of the coating product containing glass microbeads applied. The inventors were able to observe the expected advantages in terms of indication of attack.

The invention may be extended to any type of retroreflective covering material compatible with an elastomeric material.

It may also be extended to a method in which the step of applying the retroreflective covering material is incorporated into the method of manufacturing the tire, namely is prior, rather than subsequent as in the present invention, to the step of curing the tire.

The invention claimed is:

1. A method for indicating attacks on a tire for a heavy vehicle, the tire comprising a tread, the tread comprising a tread surface having two axial ends extended radially inwards by two tread end faces, each tread end face being extended radially inwards by a sidewall external face, a tread end face and the sidewall external face extending it radially inwards constituting a tire lateral face, the tire lateral face being provided with two adjacent circumferential grooves of different depths, the method comprising:
   a first step of applying a retroreflective covering material to said circumferential grooves of the tire lateral face having different depths allowing visual detection in an environment of darkness of that part of tire lateral face having the covered grooves;
   a second step of using the tire in a mechanically aggressive environment that exposes said retroreflective covering material to mechanical attack; and
   a third step of identifying, in an environment of darkness, attacked zones of the part of the covered grooves initially covered with the retroreflective covering material and now devoid of said retroreflective covering material as a result of the mechanical attack experienced by the tire in said second step, and determining a depth of attack on the tire based on which of the covered grooves remain covered by said retroreflective covering material in said attacked zones.

2. The method for indicating attacks on a tire according to claim 1, wherein the first step comprises applying the retroreflective covering material to at least part of at least one sidewall external face.

3. The method for indicating attacks on a tire according to claim 1, wherein the first step comprises applying the retroreflective covering material to at least part of at least one tread end face.

4. The method for indicating attacks on a tire according to claim 1, wherein the first step comprises applying the retroreflective covering material of coating product type.

5. The method for indicating attacks on a tire according to claim 4, wherein the first step comprises applying the retroreflective covering material of the coating product type containing glass microbeads.

6. The method for indicating attacks on a tire according to claim 1, wherein the third step of identifying, in an environment of darkness, the attacked zones of the part of at least one tire lateral face further comprises a step of locating the attacked zones of the tire lateral face.

7. A method for indicating attacks on a tire for a heavy vehicle, the tire comprising a tread, the tread comprising a tread surface having two axial ends extended radially inwards by two tread end faces, each tread end face being extended radially inwards by a sidewall external face, a tread end face and the sidewall external face extending it radially inwards constituting a tire lateral face, the method comprising:
   forming first and second adjacent circumferential grooves in the tire lateral face, the first groove having a greater depth than the second groove;
   applying a retroreflective covering material in each of the first and second grooves allowing visual detection in an environment of darkness of parts of the tire lateral face having the covered two grooves, the applied retroreflective covering material being of greater depth in the first groove than in the second groove;
   using the tire in a mechanically aggressive environment that exposes said retroreflective covering material to mechanical attack; and
   identifying, in an environment of darkness, attacked zones of the part of the first and second grooves initially covered with the retroreflective covering material and now devoid of said retroreflective covering material as a result of the mechanical attack experienced by the tire in said using step, and determining a depth of attack on the tire based on which of the two grooves remains covered by said reflective covering material in said attacked zones.

* * * * *